United States Patent [19]
Bailey

[11] 3,804,368
[45] Apr. 16, 1974

[54] RATCHET TENSIONERS

[75] Inventor: Peter John Dennis Bailey, Royston, England

[73] Assignee: Irvin Great Britain Limited, Letchworth, Hertfordshire, England

[22] Filed: Feb. 29, 1972

[21] Appl. No.: 230,243

[30] Foreign Application Priority Data
Mar. 4, 1971  Great Britain...................... 6033/71

[52] U.S. Cl.............. 254/51, 105/369 T, 248/361, 254/164, 280/179 A
[51] Int. Cl.......................... B66f 1/00, A63b 61/04
[58] Field of Search............ 254/51, 150, 164, 167; 280/179 A; 74/148, 149, 154, 155; 105/369 T; 248/361

[56] References Cited
UNITED STATES PATENTS
2,670,924  3/1954  Baty.................................. 254/164
3,428,331  2/1969  Morgan et al. ................. 280/179 A Primary Examiner—Othell M. Simpson
Attorney, Agent, or Firm—Browne, Beveridge, DeGrandi & Kline

[57] ABSTRACT

A ratchet tensioner for tensioning for example webbing comprises a reciprocable lever mounting a first pawl engaging a ratchet wheel connected to two parallel bars forming a reel so that when the lever member is reciprocated, movement in one direction causes rotation of the ratchet wheel and reel so that webbing may be wound on the reel and thus tensioned. When the lever moves in the opposite direction, the first pawl rides over the ratchet wheel and a second pawl engages the ratchet wheel to prevent the webbing unwinding from the reel. When the lever is moved to a rest position at its limit of travel in the opposite direction, a release lever, spring-biassed towards an inoperative position, may be operated in accordance with the invention so as in one operative action to lift the pawls out of engagement with the ratchet wheel so that the reel is free to rotate and the tension in the webbing can be released. This is achieved by a projection at one end of the release lever acting on an end portion of the first pawl to lift the pawl out of engagement with the ratchet wheel. The first pawl acts on a rocker member disposed between the pawls and the rocker member in turn acts on an end portion of the second pawl to transmitt the movement of the first pawl to the second pawl to lift the second pawl out of engagement with the ratchet wheel.

8 Claims, 6 Drawing Figures

RATCHET TENSIONERS

The present invention relates to ratchet tensioners. Such tensioners are known for tensioning cable or webbing which may be used for example in securing a cargo to a pallet.

Many of the known ratchet tensioners have included a complicated mechanism for releasing the tension in the webbing when it is wished to release the webbing. An object of the present invention is to provide a ratchet tensioner having a particularly simple manner of releasing the tension in the webbing.

The present invention provides a ratchet tensioner an elongate flexible tension member of, for example, webbing, comprising; reel means on which a free end of the tension member may be wound by rotation thereof to tension the tension member; ratchet means connected to said reel means to rotate therewith; a lever member carrying a first pawl for engaging said ratchet means so that movement of said lever member in one direction rotates the reel means via said first pawl and ratchet means; a second pawl for engaging said ratchet means to prevent rotation of said reel means in a direction such as to unwind the tension member so that the lever member may be reciprocated, movement in one direction causing the reel means to wind up the tension member and movement in the opposite direction allowing the first pawl to ride over the ratchet means; and a single release member manually operable so as in one operative action to cause said first and second pawls to be lifted away from the ratchet means to allow rotation of the reel means to that tension, if any, in the tension member is released.

It will thus be seen that the one action of moving the single manually-operable release member will release tension in the tension member.

Preferably the release member is arranged so as to be effectively operable only when the lever member is at that end of its reciprocatory path reached after it has been moved in said opposite direction. This is the position in which, in use, the lever member will normally rest and thus further movement of the lever from its rest position is not required before release can be effected as will be the case if the release member were only operable when the lever member was at the opposite end of its reciprocatory path.

One way of ensuring that the release member only releases both pawls when the lever member is in its rest position is to only allow the release member to release one of the pawls through the other of the pawls. It can be seen that in this case the release means is only operable to release both pawls when the two pawls are adjacent i.e. when the lever member is in its rest position, and is not operable when they are moved apart by movement of the lever member away from its rest position. Whilst it may be arranged that the release member releases the second pawl and the second pawl thereby releases the first pawl we prefer the release member to be in the form of a release lever which acts directly on said first pawl when it is rocked to lift said first pawl from the ratchet means and which acts indirectly on said second pawl via the first pawl. A rocker may be provided between the two pawls to transmit movement of the first pawl to the second pawl when the lever member is in its rest position.

The reel means may be in the form of a drum but we prefer to provide two spaced parallel bars which rotate about an axis parallel thereto and between them.

A ratchet tensioner illustrating a preferred embodiment of the invention will now be described with reference to the accompanying drawings in which.

Figure 1:
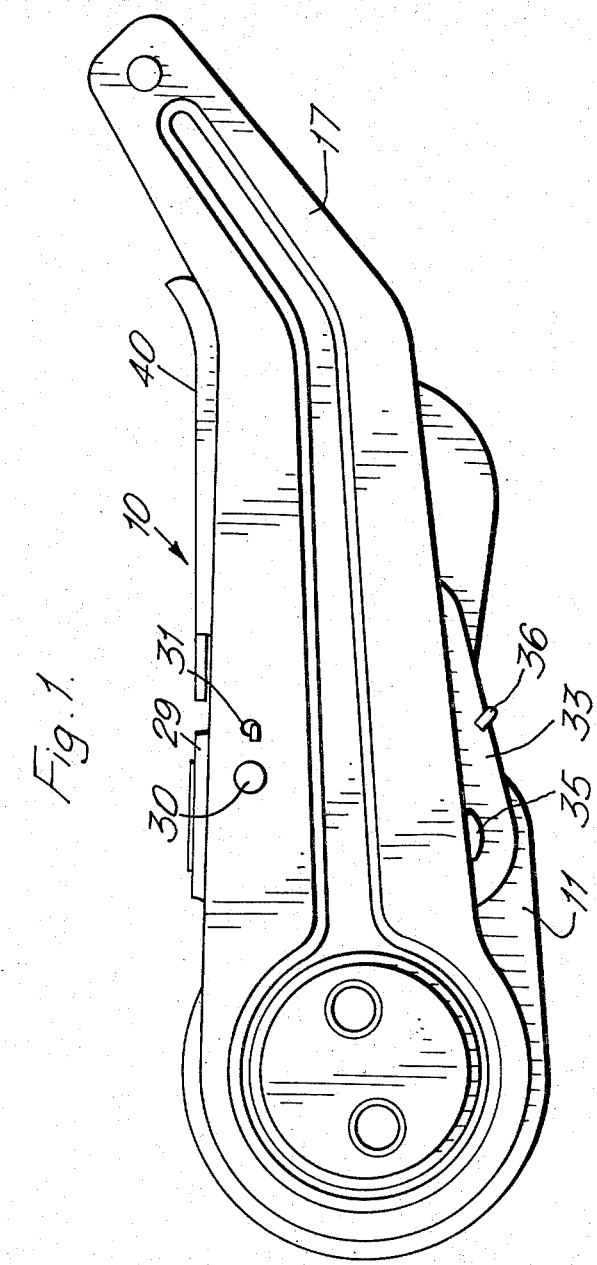
FIG. 1 shows a side view of the tensioner according to the invention.
Figure 2:
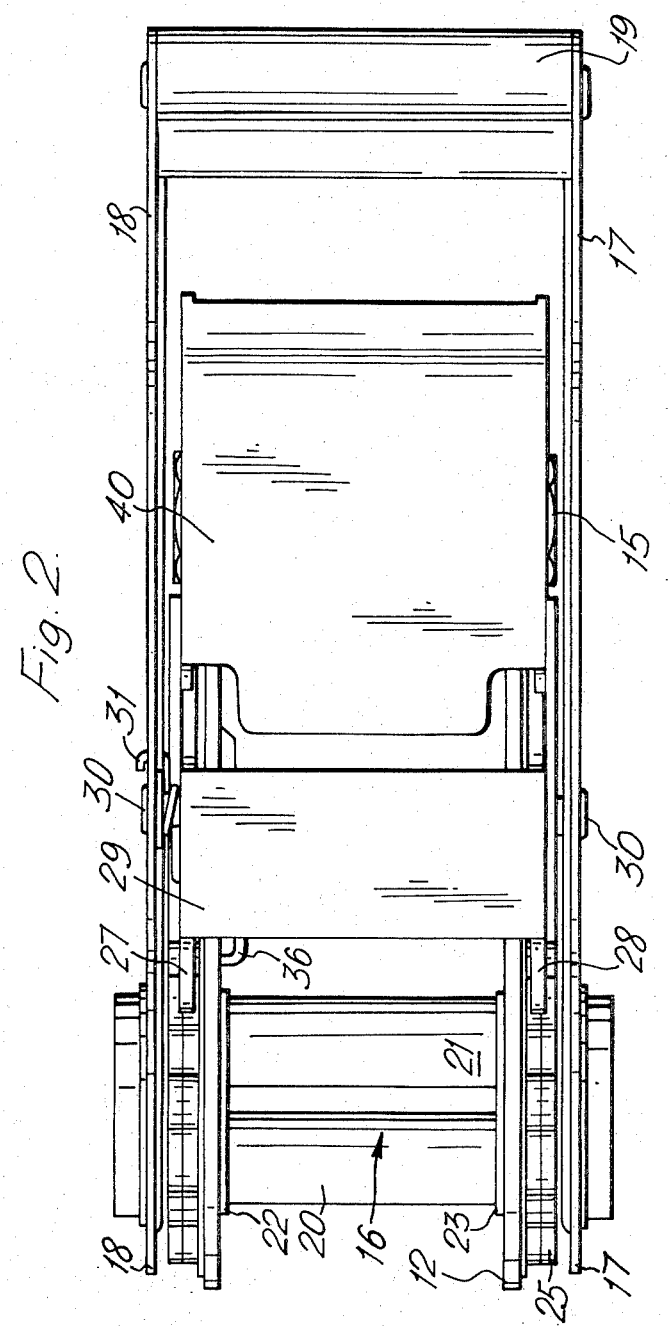
FIG. 2 shows a plan view of the tensioner of FIG. 1.
Figure 3:
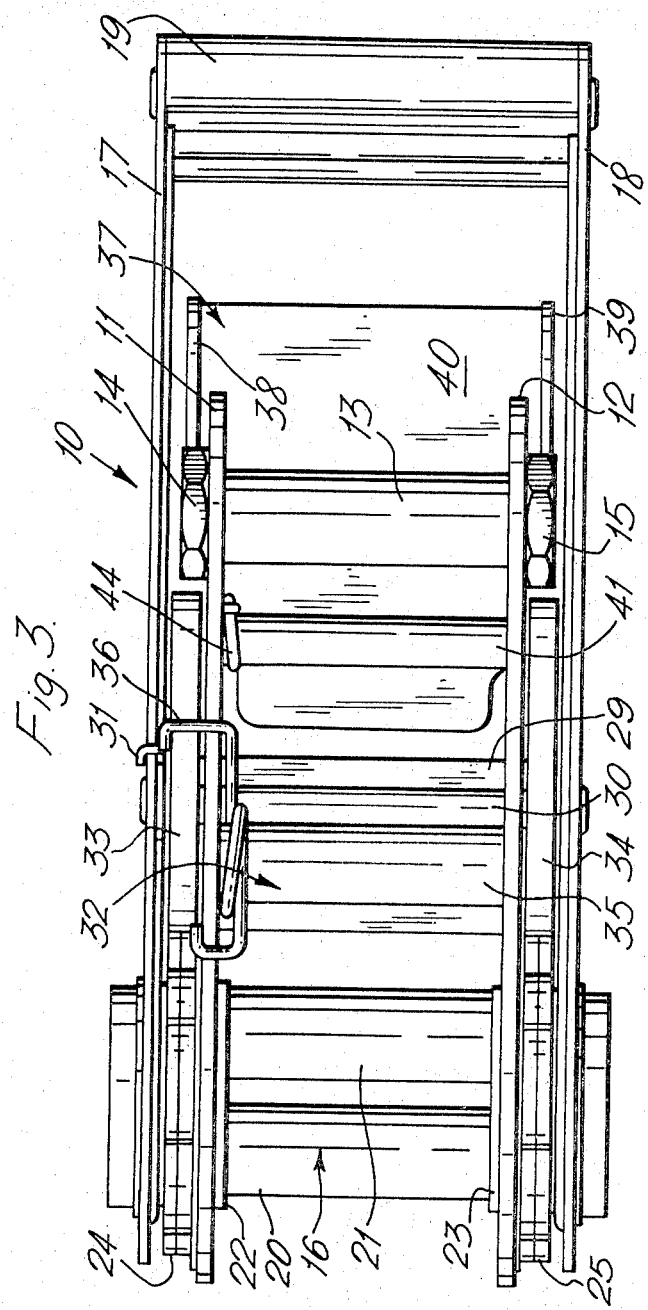
FIG. 3 shows an under plan view of the tensioner of FIG. 1.

The ratchet tensioner 10 comprises two spaced parallel plate members 11, 12 connected adjacent respective end portions by a bar 13 having threaded ends on which nuts 14 and 15 are threaded. Alternatively the bar 13 could be replaced by a headed bolt, in which case only one nut would be necessary. The opposite end of the plate members 11 and 12 are held together by a reel 16 which is rotatably mounted adjacent its ends in the plates 11, 12.

Rotatably mounted on respective end portions of the reel 16 are a pair of lever arms 17, 18 which in their rest positions extend from the reel 16 beyond the nuts 14 and 15 at the opposite ends of the plate 11, 12. The ends of the lever arms 17, 18 which extend beyond the side plates 11, 12 are connected together by a handle 19.

The reel 16 is provided by two spaced parallel bars 20, 21 which are both parallel to and spaced from the axis of rotation of the reel 16. The bars 20, 21 are mounted at their ends in circular plates 22, 23 adjacent the inner surfaces of the plates 11, 12 which thereby form bearing surfaces. A ratchet wheel 24, 25 is keyed to respective ends of the reel 16, the ratchet wheel 24 being situated between the side plate 11 and the lever arm 17 and the ratchet wheel 25 being situated between the side plate 12 and the lever arm 18.

A first pawl member 26 is provided in the form of two first pawls 27, 28 for engaging respective ratchet wheels 24, 25. The two first pawls 27, 28 are mounted on respective lever arms 17, 18 and are interconnected by a bridge member 29. The shape of the first pawls 27, 28 and the complementary shape of the ratchet wheels 24, 25 is illustrated more clearly in FIGS. 4, 5 and 6. The pivot for the two first pawls 27, 28 comprises a bar 30 secured at opposite ends in the lever arms 17, 18 and extending therebetween. A spring 31 is provided which is wrapped around the bar 30 and acts between the lever arm 17 and the first pawl member 26 to urge the two first pawls 27, 28 into engagement with the ratchet teeth of the ratchet wheels 24, 25.

A second pawl member 32 comprises two second pawls 33, 34 rigidly mounted on a bar 35, end portions of the bar 35 being rotatably mounted in respective side plates 11, 12. The relative shape and positioning of the second pawl 33 is more clearly shown in FIGS. 4, 5 and 6. A spring 36 is mounted around the bar 35, opposite ends of the spring being connected to the second pawl 33 and the side member 11. The spring 36 urges the second pawls 33, 34 into engagement with the ratchet wheels 24, 25 respectively.

The release mechanism for the ratchet tensioner comprises a single manually operable release member 37 which comprises two side plates 38, 39 situated between the lever arms 17, 18 and the side plates 11, 12 respectively which are connected together by a bridge 40 which extends across a large proportion of the top surface of the tensioner. The release member is rotatably mounted on the side plates 11, 12 by a bar 41. Adjacent the side plates 38, 39 of the release member 37 and rotatably mounted on the bar 41 are rocker plates 42, 43. A spring 44 is mounted on the bar 41 and acts between the release member 37 and the side plate 12 to urge the release member to a non-release position.

Figure 4:
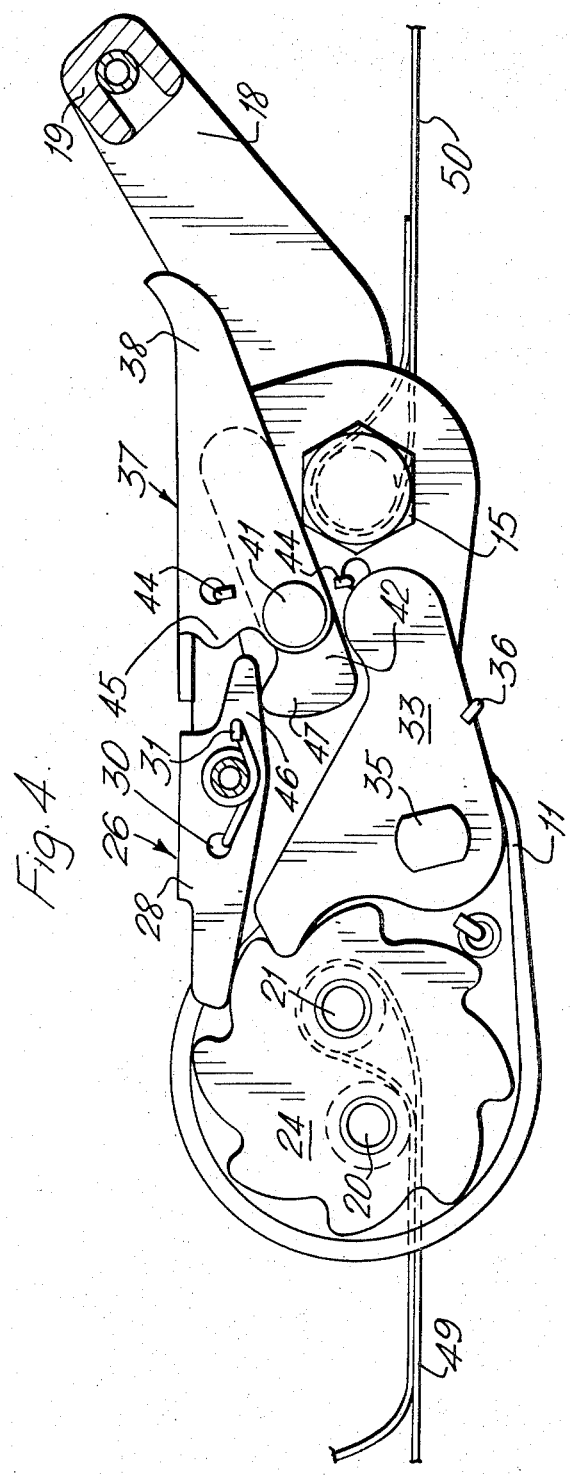
FIGS. 4, 5 and 6 show side views of the tensioner in various operative positions, with part of the tensioner cut away.
Figure 5:
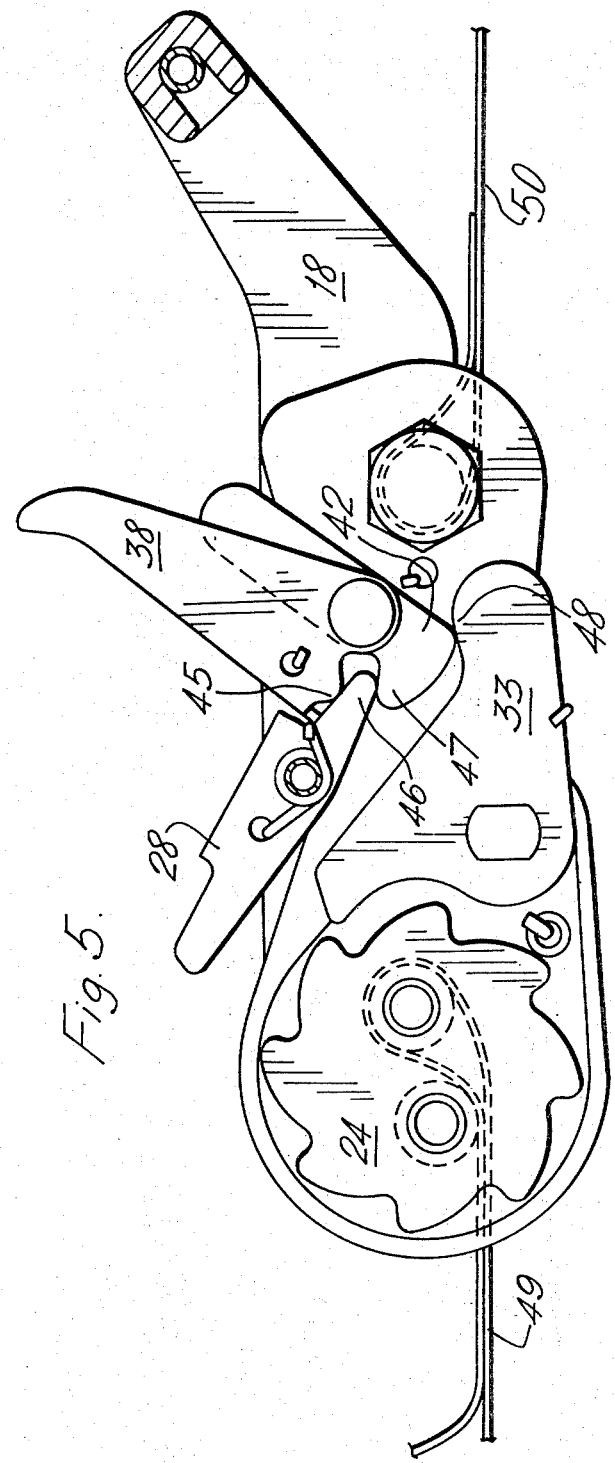
Figure 6:
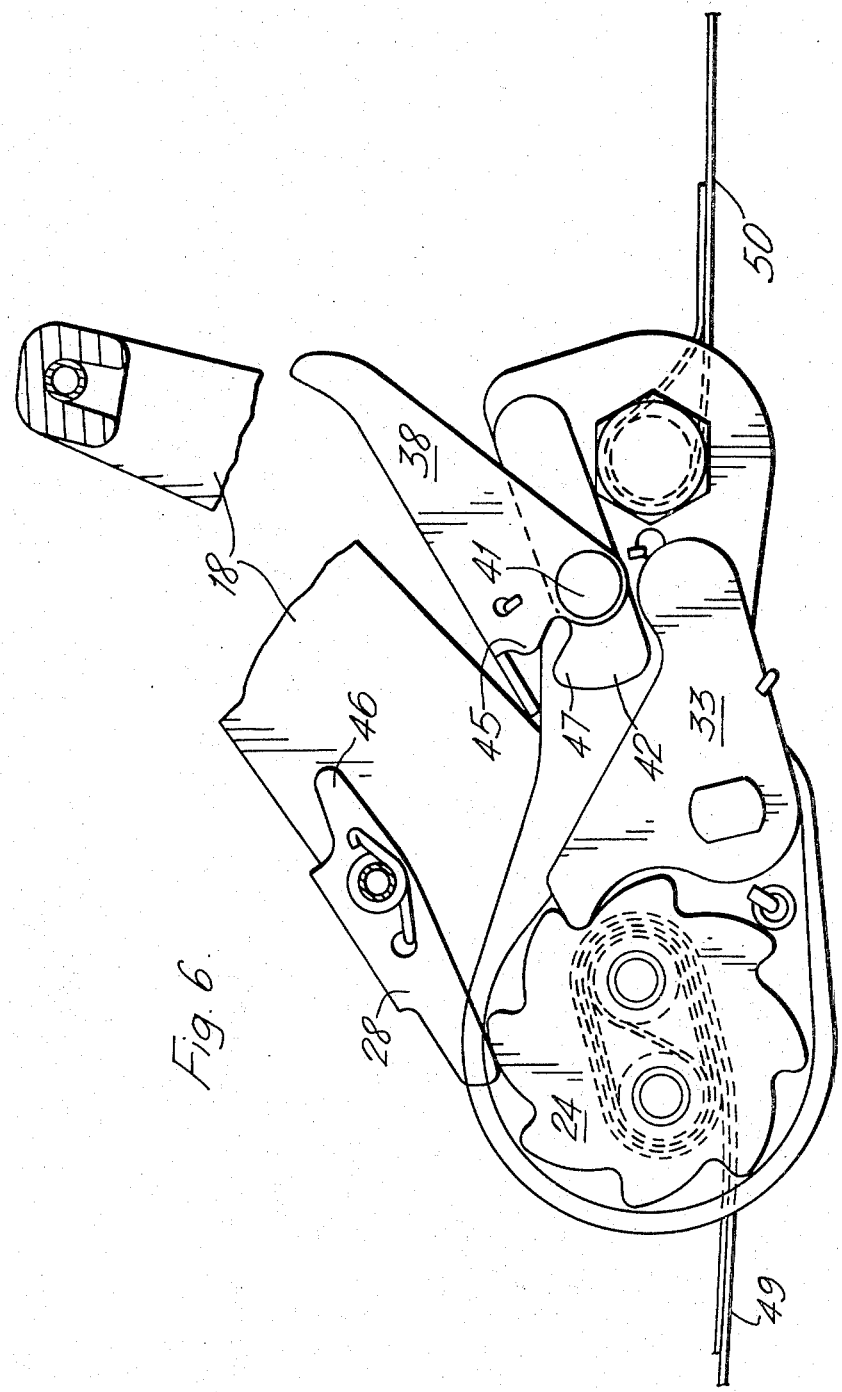

FIGS. 4, 5 and 6 show side views of the tensioner with the lever arm 17 removed to more clearly show the operation of the tensioner. Reference may be made to these Figures which show more clearly the shapes of the first pawl 28, the second pawl 33, the side plate 38 of the release member 37, and the rocker plate 42 and their interaction. It will be understood that the corresponding parts on the opposite side of the tensioner are the same shape and act in the same way.

Referring to FIGS. 4, 5 and 6 it will be seen that the side plate 38 includes a projection 45 situated adjacent one side of a tail 46 of the first pawl 28. The opposite side of the tail 46 rests on a nose 47 of the rocker plate 42 when the tensioner is in its inoperative position and the opposite side of the nose of the rocker 42 rests on a tail portion 48 of the second pawl 33. The exact disposition of these parts is illustrated clearly in FIG. 4 which shows the tensioner with the lever arms 17, 18 in their rest position. It will be noted that the projection 45 is spaced from the tail 46 so as to allow the first pawl 28 to be moved away from the side plate 38 when the lever arms 17, 18 are moved away from their rest position. The tail 46 and the nose 47 are in contact and the rocker 42 and the tail 46 are substantially in contact.

The mode of operation of the ratchet tensioner will now be described. One end of webbing 49 is wrapped around one of the bars 21 of the reel 16. The other end of the webbing is passed over, say, the cargo and is secured to one side of a pallet and further webbing 50 from the other side of the pallet is secured to the bar 13.

The lever arms are lifted from the position shown in FIG. 4 to the position shown in FIG. 6 and as can be seen the first pawl 28 will engage the ratchet wheel 24 and rotate the ratchet wheel 24 to thereby rotate the reel 16 and wind the webbing 49 onto the reel. It will be noted that the free end of the webbing will be trapped and thus held securely as the reel 16 rotates. After the lever arms 17, 18 are moved to the limit of the possible movement in an anticlockwise direction (relative to FIGS. 4 to 6) the lever arms 17, 18 may be moved back in a clockwise direction. It will be appreciated that the second pawl 33 remains engaged with the ratchet at this time and when the lever arms 17, 18 are moved in a clockwise direction, the first pawl 28 rides over the ratchet wheel 24 and the second pawl 33 holds the ratchet wheel 24 and hence the reel 16 and prevents movement in a clockwise direction with the lever arms 17, 18. By reciprocating the lever arms 17, 18 it will be seen that the ratchet means is rotated in an anticlockwise direction to wind up the reel 16. As above noted, the shape of the tail 46 of the first pawl 28 and the shape of the projection 45 of the release member 37 and their relative disposition are such as to not interfere with this reciprocating motion of the lever arms 17, 18.

The length of the lever arms 17, 18 is such that an operator of normal strength would not be able to tension the webbing sufficiently to break it.

When the webbing has tensioned sufficiently the lever arms are returned to the rest position shown in FIG. 4. It is desirable to retain the lever arms in the rest position and for this reason a latch facility is provided. The release member mounting bar 41 has rolled ends which protrude sufficiently from the release member side plates 38, 39 to engage ridges stamped into the lever arms 17, 18. This latch facility is not shown in the drawings.

When the lever arms 17, 18 are in the rest position the tension in the webbing may be released by the release mechanism and the reel 16 allowed to rotate freely. To release the reel 16, the release member 37 is manually lifted so that the projection 45 on the side plate 38 of the release member 37 contacts the tail 46 of the first pawl 28 and hence lifts this pawl from the ratchet wheel 24. It will be noticed that the ratchet wheel 24 is still held by the second pawl 33. Further movement upwardly of the release member 37 however causes further downward movement of the tail 46 of the first pawl 28 which thereby contacts the nose 47 of the rocker 42 and transmits this motion through the tail 46 to the second pawl 33. The second pawl 33 is thus also lifted from the ratchet wheel 24 and the ratchet wheel is thus free to rotate to release the tension in the webbing and also to allow the webbing to be disengaged from the reel. As stated before it will be appreciated that the other side of the ratchet tensioner operates in the same way so that the other ratchet wheel 25 is also simultaneously released.

FIG. 6 illustrates clearly why it is not possible to release the tension in the webbing by operating the release machanism when the lever arms 17, 18 are not in their rest positions. When the lever arms 17, 18 are out of their rest positions as shown in FIG. 6 movement of the release member 37 cannot cause the projection 45 to contact the tail 46 of the first pawl 28 since the first pawl 28 has moved away from adjacent the projection 45 with the lever arms 17, 18. It is not possible for the projection 45 to directly contact the nose 47 of the rocker 42 and hence release the second pawl since rotation of the release member 37 is limited.

It will thus be seen that there is provided a ratchet tensioner in which the first and second pawls are lifted from the ratchet wheel and the tension in the reel 16 easily released by a single manually operable movement of a release member. Furthermore the construction of the ratchet tensioner is almost wholly of stamped plates and cut bars which renders construction of the ratchet tensioner a relatively simple and therefore cheap process. The bridge members 40 and 29 cover a large part of the top surface of the ratchet tensioner to reduce the ingress of dirt and grit into the mechanism and to prevent or at least reduce the possibility of loose ropes or webbings becoming entangled with the mechanism, these having been problems experienced with prior ratchet tensioners in view of the type of locations, such as docks, where they are used. It will also be noted that the tensioner is of a particularly compact design and layout with the mechanism of the tensioner generally situated between the lever arms. The edge of the bridge member 40 is easily gripped by the fingers when the lever arms are in their rest position.

It will be appreciated that various washers which provide anti-friction means and spacing means are provided at the point where the reel 16 is mounted in the side plates 11, 21 and the lever members 17, 18. An additional advantage of such washers is that they prevent chafing of moving parts and thus protect the moving parts from the rubbing off of protective platings with consequent corrosion. These are not described in detail.

It will be appreciated that the invention is not restricted to the details of foregoing example. For example, it might be possible in some applications to eliminate the use of the rocket 42 and allow the first pawl 28 to bear directly on the second pawl 33 when the lever arms 17, 18 are in their rest position.

I claim:

1. A ratchet tensioner for an elongate flexible member comprising a tensioner body; reel means mounted on the tensioner body on which a free end of the tension member; may be wound by rotaiton thereof to tension the tension member, ratchet wheel means connected to said reel means to rotate therewith; a lever member carrying a first pawl means for engaging said ratchet means so that movement of said lever member in one direction rotates the reel means via said first pawl means and ratchet means, said first pawl means including a coacting tension release portion; a second pawl means mounted on the tensioner body for engaging said ratchet wheel means to prevent rotation of said reel means in a direction such as to unwind th tension member so that the lever member may be reciprocated, movement in one direction causing the reel means to wind up the tension member and movement in the opposite direction allowing the first pawl means to ride over the ratchet means, said second pawl means including a coacting tension release portion; a manually operable release member; and first pawl movement transmitting means, said release member including a portion which coacts with said coacting tension release portion of said first pawl means for lifting said first pawl means out of engagement with said ratchet wheel means, said first pawl movement transmitting means coacting with movement of said first pawl means and coacting with said coacting tension release portion of said second pawl means to transmit movement of said first pawl means to said second pawl means for disengaging said second pawl means from said ratchet wheel means on disengagement of said first pawl means from said ratchet wheel by actuation of said release member and subsequent to disengagement of said first pawl means from said ratchet wheel.

2. A tensioner as claimed in claim 1 wherein said release member is mounted on the tensioner body so that it can only act on said first pawl means when the lever member is in a predetermined position relative to the tensioner body.

3. A tensioner as claimed in claim 1 wherein said first pawl transmitting means comprises a rocker member disposed between said first and second pawl means for transmitting release movement of said first pawl means to said second pawl means.

4. A tensioner as claimed in claim 2 wherein said first pawl means is rotatably mounted and spring means are provided for biasing said first pawl means into engagement with the ratchet wheel means, and said release member comprises a rotatably mounted lever having a portion for acting on said coacting tension release portion of said first pawl means to rotate said first pawl means thereby to lift said first pawl means out of engagement with the ratchet wheel means.

5. A tensioner as claimed in claim 3 wherein said second pawl means is rotatably mounted and spring means are provided for biasing said second pawl means into engagement with the ratchet wheel means, and said rocker member is arranged to act on said coacting tension release portion of said second pawl means to rotate and thereby to lift said second pawl means out of engagement with the ratchet wheel means.

6. A tensioner as claimed in claim 3 wherein said release member comprises a rotatably mounted lever, said lever being coaxially mounted with said rocker member on said tensioner body.

7. A tensioner as claimed in claim 6 wherein said first and and second pawl means are rotatably mounted and said first and second pawl means have respective first and second end portions disposed on opposite sides of their respective mountings, spring means are provided for biasing said first end portions of said first and second pawl means into engagement with said ratchet wheel means; said lever has a projection for acting on the first pawl means second end portion for lifting said first pawl means out of engagement with said ratchet wheel means, and said rocker member has a nose portion for engaging both end portions of said first and second pawl means for transmitting release movement of said pawl means to said second pawl means.

8. A ratchet tensioner for an elongate flexible tension member comprising a tensioner body; reel means mounted on the tensioner body on which a free end of the tension member may be wound by rotation thereof to tension the tension member; ratchet wheel means connected to said reel means to rotate therewith; a lever member carrying a first pawl means for engaging said ratchet means so that movement of said lever member in one direction rotates the reel means via said first pawl means and ratchet means; a second pawl means mounted on the tensioner body for engaging said ratchet wheel means to prevent rotation of said reel means in a direction such as to unwind the tension member so that the lever member may be reciprocated, movement in one direction causing the reel means to wind up the tension member and movement in the opposite direction allowing the first pawl means to ride over the ratchet means; and a release lever, means pivotally mounting said release lever on said tensioner body, means providing for transmission of pivotal movement of said release lever to said first and second pawl means first to disengage said first and thereafter said second pawl means from said ratchet wheel means, and means limiting the effectiveness of said transmission means to a predetermined position of said lever member with respect to said tensioner body.

* * * * *